United States Patent
Ma et al.

(10) Patent No.: US 12,232,060 B2
(45) Date of Patent: Feb. 18, 2025

(54) SYNCHRONIZATION INDICATION METHOD AND DEVICE

(71) Applicant: VIVO MOBILE COMMUNICATION CO., LTD., Guangdong (CN)

(72) Inventors: Yue Ma, Chang'an Dongguan (CN); Xiaodong Yang, Chang'an Dongguan (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 7 days.

(21) Appl. No.: 16/961,659

(22) PCT Filed: Jan. 10, 2019

(86) PCT No.: PCT/CN2019/071134
§ 371 (c)(1),
(2) Date: Jul. 10, 2020

(87) PCT Pub. No.: WO2019/137422
PCT Pub. Date: Jul. 18, 2019

(65) Prior Publication Data
US 2020/0404602 A1    Dec. 24, 2020

(30) Foreign Application Priority Data
Jan. 11, 2018   (CN) .......................... 201810027222.0

(51) Int. Cl.
*H04W 56/00*  (2009.01)
*H04W 24/10*  (2009.01)
(Continued)

(52) U.S. Cl.
CPC ......... *H04W 56/001* (2013.01); *H04W 24/10* (2013.01); *H04W 36/0061* (2013.01); *H04W 48/16* (2013.01)

(58) Field of Classification Search
CPC . H04W 24/10; H04W 56/001; H04W 72/042; H04W 72/0453; H04W 56/0015;
(Continued)

(56) References Cited

U.S. PATENT DOCUMENTS

| | | | |
|---|---|---|---|
| 7,024,194 B1 | 4/2006 | Oksanen | |
| 2009/0219889 A1* | 9/2009 | Schwarz | H04W 36/18 370/331 |

(Continued)

FOREIGN PATENT DOCUMENTS

| | | |
|---|---|---|
| CN | 101557604 A | 10/2009 |
| CN | 102932880 A | 2/2013 |

(Continued)

OTHER PUBLICATIONS

3GPP TS 38.331 V15.0.0, dated Dec. 2017 (Year: 2017).*
(Continued)

*Primary Examiner* — Raymond S Dean
(74) *Attorney, Agent, or Firm* — Price Heneveld LLP

(57) ABSTRACT

The present disclosure provides a synchronization indication method and device. The method includes: receiving synchronization indication information transmitted by a network device, where the synchronization indication information indicates one or more serving cells as timing reference for a neighboring cell; taking time of a corresponding serving cell as timing reference for the neighboring cell according to the synchronization indication information.

17 Claims, 3 Drawing Sheets

(51) Int. Cl.
*H04W 36/00* (2009.01)
*H04W 48/16* (2009.01)

(58) Field of Classification Search
CPC ..... H04W 48/12; H04W 76/19; H04W 16/14; H04W 36/08; H04W 56/0005; H04W 36/00835; H04W 72/005; H04W 36/0058; H04W 36/0061; H04W 36/0069; H04W 48/10; H04W 76/15; H04W 24/02; H04W 24/04; H04W 36/165; H04W 4/08; H04W 56/00; H04W 56/002; H04W 56/005; H04W 28/06; H04W 4/50; H04W 48/16; H04L 5/001; H04L 1/1854; H04L 27/2613; H04L 27/2657; H04L 5/00; H04L 5/0007; H04L 1/0027; H04L 27/261; H04L 5/0039; H04L 5/0094; H04L 41/0803; H04J 3/0635; H04J 11/0069

See application file for complete search history.

(56) References Cited

U.S. PATENT DOCUMENTS

| | | | | |
|---|---|---|---|---|
| 2013/0114576 A1* | 5/2013 | Kwon | .................. | H04W 28/18 370/336 |
| 2013/0176952 A1* | 7/2013 | Shin | .................... | H04W 72/042 370/329 |
| 2013/0288672 A1 | 10/2013 | He et al. | | |
| 2014/0198676 A1* | 7/2014 | Han | ...................... | H04W 24/10 370/252 |
| 2015/0092768 A1* | 4/2015 | Ng | ........................ | H04W 48/16 370/350 |
| 2015/0172990 A1* | 6/2015 | Patel | ............... | H04W 36/00835 370/332 |
| 2015/0304875 A1 | 10/2015 | Axmon et al. | | |
| 2016/0029333 A1 | 1/2016 | Seo et al. | | |
| 2016/0100324 A1* | 4/2016 | Henry | .................... | H04L 45/28 370/218 |
| 2016/0286424 A1 | 9/2016 | Li et al. | | |
| 2016/0302098 A1* | 10/2016 | Gheorghiu | ........ | H04W 36/0088 |
| 2017/0310415 A1* | 10/2017 | Thangarasa | ........... | H04W 56/00 |
| 2019/0132845 A1* | 5/2019 | Babaei | .................. | H04L 1/1812 |
| 2021/0337442 A1* | 10/2021 | Da Silva | ............... | H04W 36/18 |

FOREIGN PATENT DOCUMENTS

| | | | | |
|---|---|---|---|---|
| CN | 103209432 A | 7/2013 | | |
| CN | 105532051 A | 4/2016 | | |
| CN | 106161317 A | 11/2016 | | |
| CN | 106233657 A | 12/2016 | | |
| JP | 2002524967 A | 8/2002 | | |
| KR | 20170007433 A | * | 1/2017 | .......... H04W 76/028 |
| WO | 2014/169576 A1 | 10/2014 | | |

OTHER PUBLICATIONS

CN Office Action in Application No. 201810027222.0 dated Dec. 19, 2019.
"Remaining issues for measurement object" 3GPP TSG-RAN WG2 Meeting #100, Nov. 27, 2017.
Clarification on remaining issues of MO content 3GPP TSG-RAN WG2 NR Ad hoc 1801, Jan. 22, 2018.
Written Opinion and International Search Report in Application No. PCT/CN2019/071134 dated Jul. 23, 2020.
Huawei et al., 'Measurement Configuration and Procedures for CSI-RS', R2-1711815, 3GPP TSG-RAN WG2 #99bis, Prague, Czech Republic, Oct. 9-13, 2017.
Huawei et al., 'Remaining Issues on Measurement Configuration' R2-1712549, 3GPP TSG-RAN WG2 #100, Reno, Nevada, USA, Nov. 27-Dec. 1, 2017.
Extended European Search Report issued in corresponding application No. 19738855.6, dated Feb. 24, 2021.
JP Office Action in Application No. 2020-538815 dated Sep. 17, 2021.
"Clarification on remaining issues of MO content" 3GPP TSG-RAN WG2 NR Ad hoc 1801, vivo, R2-1800869, Jan. 22, 2018.
JP Office Action in Application No. 2020-538815 Dated May 23, 2022.
"Summary of Discussion for NR RRM measurements" 3GPP TSG RAN WG1 Meeting #92, Intel Corporation, R1-1803399, Feb. 26, 2018.
"Presentation of Specification TS 38.331, Version 1.0.0" 3GPP TSG-RAN Meeting #77, TSG RAN WG2, RP-172570, Dec. 18, 2017.
"3rd Generation Partnership Project, Technical Specification Group Radio Access Network, NR, Radio Resource Control (RRC), Protocol specification (Release 15)" 3GPP TS 38.331 V1.0.0, Dec. 2017.
EP Office Action in Application No. 19738855.6 Dated Jan. 18, 2023.

* cited by examiner

SYNCHRONIZATION INDICATION METHOD AND DEVICE

CROSS-REFERENCE TO RELATED APPLICATION

This application is the U.S. national phase of PCT Application PCT/CN2019/071134 filed on Jan. 10, 2019, which claims the benefit and priority of Chinese Application No. 201810027222.0, filed on Jan. 11, 2018, which is incorporated herein by reference in its entirety.

TECHNICAL FIELD

The present disclosure relates to the field of communication technologies, and in particular to a synchronization indication method and device.

BACKGROUND

When a user equipment (UE) is configured with carrier aggregation (CA) or dual connectivity (DC), there may be different serving cells. However, it is not configured in the related art that the UE uses the time of which serving cell as a timing reference for neighbor cell synchronization or measurement.

SUMMARY

One object of embodiments of the present disclosure is to provide a synchronization indication method and device, which can solve the problem that it is not configured in the related art that UE uses which serving cell as timing reference for neighbor cells.

According to a first aspect, a synchronization indication method is provided, and the method is applied to a user equipment and includes: receiving synchronization indication information transmitted by a network device, wherein the synchronization indication information indicates one or more serving cells as timing reference for a neighboring cell; taking time of a corresponding serving cell as timing reference for the neighboring cell according to the synchronization indication information.

According to a second aspect, a synchronization indication method is provided, and the method is applied to a network device and includes: transmitting synchronization indication information to a user equipment, wherein the synchronization indication information indicates one or more serving cells as timing reference for a neighboring cell.

According to a third aspect, a user equipment is provided and includes: a receiving module configured to receive synchronization indication information transmitted by a network device; wherein the synchronization indication information indicates one or more serving cells as timing reference for a neighboring cell; and a processing module configured to take time of a corresponding serving cell as timing reference for the neighboring cell according to the synchronization indication information.

According to a fourth aspect, a network device is provided and includes: a transmission module configured to transmit synchronization indication information to a user equipment, wherein the synchronization indication information indicates one or more serving cells as timing reference for a neighboring cell.

According to a fifth aspect, a user equipment is provided and includes: a processor, a memory, and a computer program stored on the memory and executable on the processor; wherein the computer program is executed by the processor to implement steps of the above synchronization indication method.

According to a sixth aspect, a network device is provided and includes: a processor, a memory, and a computer program stored on the memory and executable on the processor; wherein the computer program is executed by the processor to implement steps of the above synchronization indication method.

According to a seventh aspect, a computer readable storage medium, is provided and includes a computer program stored thereon; wherein the computer program is executed by a processor to implement steps of the synchronization indication method according to the first aspect, or to implement steps of the synchronization indication method according to the second aspect.

In this way, the synchronization indication information indicates one or more serving cells as timing reference for the neighboring cell, so that the UE can take the time of the corresponding serving cell as timing reference for the neighboring cell according to the synchronization indication information, thereby realizing explicit indication of whether the neighboring cell and the serving cell are synchronized, which facilitates the UE to measure the neighboring cell without blind detection and then saves power consumption of the UE.

BRIEF DESCRIPTION OF THE DRAWINGS

By reading detailed description of the following optional embodiments, various other advantages and benefits will become clear to those skilled in the art. The drawings are only for the purpose of illustrating the optional embodiments and are not considered to be a limitation of the present disclosure. Further, throughout the drawings, the same reference symbols are used to denote the same parts.

DETAILED DESCRIPTION

The technical solutions in embodiments of the present disclosure will be described hereinafter in a clear and complete manner in conjunction with the drawings in the embodiments of the present disclosure. Obviously, the following embodiments are merely a part of, rather than all of, the embodiments of the present disclosure, and based on these embodiments, a person skilled in the art may obtain the other embodiments, which also fall within the scope of the present disclosure.

The terms "include" or its variations in the specification and claims of the present application are intended to encompass a non-exclusive inclusion, such that a process, method, system, product, or device that include a series of steps or units include not only those steps or units but also other steps or units which are not explicitly listed, or steps or units that are inherent to such process, method, product, or device. In addition, "and/or" used in the specification and claims of the present application means at least one of connected objects, for example, A and/or B, means that there are three cases of including a single A, including a single B, and including both A and B.

In the embodiments of the present disclosure, the terms "exemplary" or "for example" are used as examples, instances or illustrations. Any embodiment or design scheme described in the embodiments of the present disclosure as "exemplary" or "for example" should not be construed as being more preferred or advantageous than other embodiments or design scheme. Specifically, the terms such as "exemplary" or "for example" are intended to present concepts in a specific way.

In order to better understand the technical solutions of the embodiments of the present disclosure, the following two technical points are first introduced.

(1) Introduction to RAN1 (RAN1 refers to a physical layer of a radio interface) physical layer agreement:

providing the UE with an indication related to synchronization information: when there is a synchronization indication for carriers, the UE may use time of a serving cell as reference time to derive an index of a synchronization signal block (SSB) of a neighboring cell.

(2) Introduction to capture content in a measurement object (MO) of RAN2 (RAN2 refers to radio resource management at a layer 2 and a layer 3 of the radio interface):

indicating whether the UE can use the time of the serving cell to derive the index of the SSB of the neighboring cell. For example, a field of "useServingCellTimingForSync" (using the time of the serving cell for synchronization) is used for indication. However, this field is only an information unit (IE) field, and there is no explanation or illustration for it. This field is used as a time synchronization indication of using time information of the serving cell to derive other cells/measurements, and its name is not limited.

Figure 1:
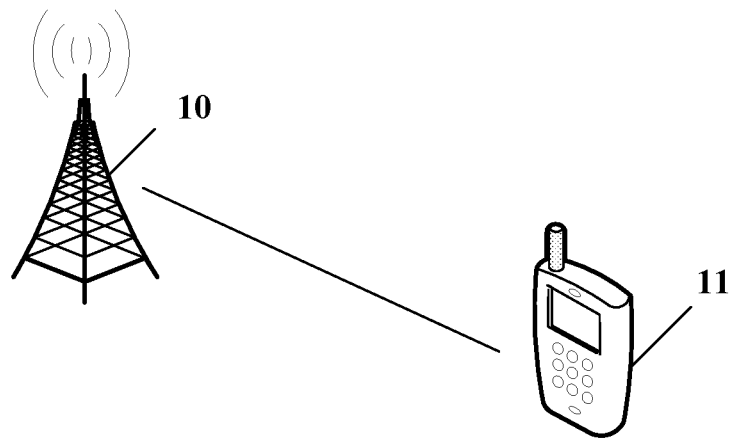
FIG. 1 is a schematic diagram of architecture of a wireless communication system according to an embodiment of the present disclosure.

Embodiments of the present disclosure will be described hereinafter in connection with the accompanying drawings. A synchronization indication method and device provided in the embodiments of the present disclosure may be applied to a wireless communication system. The wireless communication system may be a system adopting the fifth generation (5G) mobile communication technology (hereinafter referred to as 5G system), or an evolved long term evolution (eLTE) system, or a subsequent evolved communication system. Referring to FIG. 1, FIG. 1 is a schematic diagram of architectural of a wireless communication system according to an embodiment of the present disclosure. As shown in FIG. 1, the wireless communication system may include a network device 10 and a user equipment. For example, the user equipment is recorded as UE 11, and the UE 11 can communicate with the network device 10. In practical application, connection between the above various devices may be wireless connection. In order to easily and intuitively represent the connection relationship between the various devices, solid lines are used in FIG. 1.

It should be noted that the above communication system may include multiple UEs, and the network device may communicate with multiple UEs (for transmitting signaling or transmitting data).

The network device provided in the embodiments of the present disclosure may be a base station. The network device may be a commonly used base station, or an evolved node base station (eNB), or may be a network device in the 5G system (such as a next generation node base station (gNB) or transmission and reception point (TRP)).

The user equipment provided in the embodiments of the present disclosure may be a mobile phone, a tablet computer, a notebook computer, an ultra-mobile personal computer (UMPC), a netbook or a personal digital assistant (PDA), etc.

Figure 2:
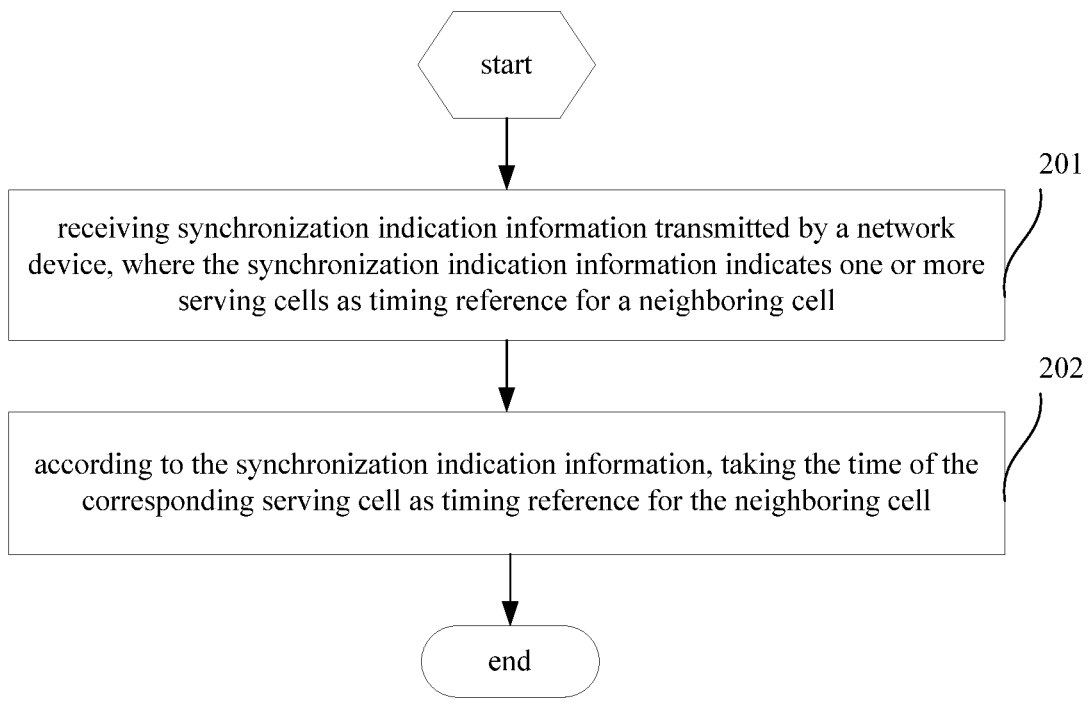
FIG. 2 is a first flowchart of a synchronization indication method according to an embodiment of the present disclosure.

Referring to FIG. 2, it a flowchart of a synchronization indication method according to an embodiment of the present disclosure. The method is executed by a UE, and specifically includes the following steps.

Step 201: receiving synchronization indication information transmitted by a network device, where the synchronization indication information indicates one or more serving cells as timing reference for a neighboring cell.

For example, a broadcast message or dedicated signaling transmitted by the network device, is received. The broadcast message or dedicated signaling includes the synchronization indication information.

Optionally, the synchronization indication information may include: a synchronization indication, and information corresponding to a serving cell that serves as a timing reference. The synchronization indication is used to indicate whether timing synchronization is required, and the information of the serving cell may be a cell identifier, etc.

Step 202: according to the synchronization indication information, taking the time of the corresponding serving cell as timing reference for the neighboring cell.

The above timing reference is equivalent to a timing synchronization reference, that is, the time of each neighboring cell is synchronized based on the time of the determined serving cell.

For example, the synchronization indication information is carried in a broadcast message, and when the synchronization indication information indicates true, a current serving cell or a serving cell configured by the network device is used as timing reference for a neighboring cell at a current frequency. Optionally, the synchronization indication information may be a field of using serving cell timing synchronization (useServingCellTimingForSync) or other synchronization indication information field. The current frequency refers to a frequency at which the UE reads the broadcast message.

For another example, the synchronization indication information is carried in a dedicated signaling, when the synchronization indication information indicates true, the serving cell configured by the network device is used as timing reference for all or part of neighboring cells at a current measurement object frequency configured by the network device. Optionally, the synchronization indication information may be a field of useServingCellTimingForSync or other synchronization indication information field.

In one embodiment of the present disclosure, optionally, one or more serving cells that serves as timing reference for a neighboring cell refer to any one or more of the following combinations:

one or more serving cells configured by the network device;

one or more special cells (SpCell) configured by the network device;

where the SpCell includes: a primary cell (PCell) and a primary-secondary cell (PSCell), the PCell is a primary node of the SpCell (PCell=SpCell of MN), and the PSCell is a secondary node of the SpCell (PSCell=SpCell of SN);

one or more cells in a cell list configured by the network device;

a cell corresponding to a frequency or a frequency group in a frequency list; and a reference serving cell configured in measurement object (MO); where the reference serving cell configured in the MO may be used as timing reference for all cells (intra-frequency and/or inter-frequency) associated with the same RAT as the reference serving cell, and the measurement object may be configured by different RAT configurations such as LTE or NR. It is worth noting that the network device may configure the synchronization indication for MO with the same frequency as a serving frequency, or for MO with different frequency from serving frequency.

In one embodiment of the present disclosure, optionally, configuration manner of one or more serving cells configured by the network device, includes any one or more of the following combinations:

one or more serving cells indicated by the network device through a physical cell identifier (PCI) and a frequency;

one or more serving cells indicated by the network device through a cell index; and one or more serving cells indicated by the network device through an E-UTRAN cell global identifier (ECGI).

In one embodiment of the present disclosure, optionally, configuration manner of one or more special cells (SpCell) configured by the network device, includes any one or more of the following combinations:

a primary cell (PCell) and/or a primary-secondary cell (PSCell) defaulted by the network device;

a PCell and/or a PSCell configured by the network device;

a PCell and/or a PSCell indicated by the network device through a physical cell identifier (PCI) and a frequency;

a PCell and/or a PSCell indicated by the network device through a cell index;

a PCell and/or a PSCell indicated by the network device through a ECGI.

In one embodiment of the present disclosure, optionally, configuration manner of one or more cells in a cell list configured by the network device, includes any one or more of the following combinations:

a serving cell indicated by the network device through a physical cell identifier (PCI) and a frequency;

a serving cell indicated by the network device through a cell index;

a serving cell indicated by the network device through a ECGI;

a PCell and/or a PSCell defaulted by the network device; and a PCell and/or a PSCell configured by the network device.

In one embodiment of the present disclosure, optionally, the frequency or the frequency group that can be referenced in the frequency list lists a center frequency.

In one embodiment of the present disclosure, optionally, the frequency list is not configured in the measurement object (MO), but is configured through fields in other dedicated signaling, i.e., setting fields in other dedicated signaling.

In this way, the synchronization indication information indicates one or more serving cells as timing reference for the neighboring cell, so that the UE can take the time of the corresponding serving cell as timing reference for the neighboring cell according to the synchronization indication information, thereby realizing the explicit indication of whether the neighboring cell and the serving cell are synchronized, which facilitates the UE to measure the neighboring cell without blind detection and then saves power consumption of the UE.

Figure 3:
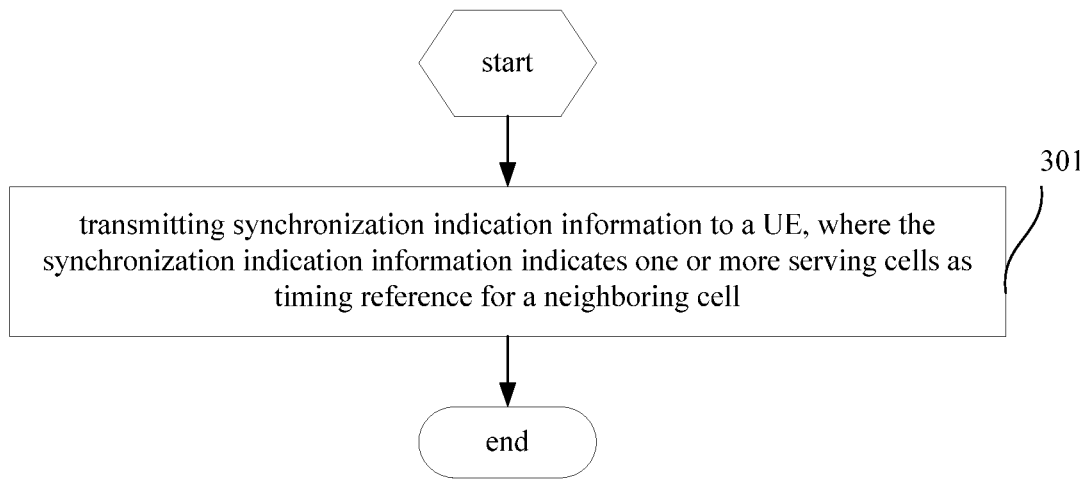
FIG. 3 is a second flowchart of a synchronization indication method according to an embodiment of the present disclosure.

Referring to FIG. 3, it is a flowchart of a synchronization indication method according to an embodiment of the present disclosure. The method is executed by a network device, and specifically includes the following steps.

Step 301: transmitting synchronization indication information to a UE, where the synchronization indication information indicates one or more serving cells as timing reference for a neighboring cell.

For example, in the step 301, a broadcast message is transmitted to the UE, and the broadcast message includes the synchronization indication information; or a dedicated signaling is transmitted to the UE, and the dedicated signaling includes the synchronization indication information.

In one embodiment of the present disclosure, optionally, the synchronization indication information may include: a synchronization indication, and information corresponding to a serving cell that serves as a timing reference.

In one embodiment of the present disclosure, optionally, one or more serving cells that serves as timing reference for a neighboring cell refer to any one or more of the following combinations:

one or more serving cells configured by the network device;

one or more special cells (SpCell) configured by the network device;

one or more cells in a cell list configured by the network device;

a cell corresponding to a frequency or a frequency group in a frequency list; and a reference serving cell configured in measurement object (MO); where the reference serving cell configured in the MO may be used as timing reference for all cells (intra-frequency and/or inter-frequency) associated with the same RAT as the reference serving cell, and the measurement object may be configured by different RAT configurations such as LTE or NR.

It is worth noting that the network device may configure the synchronization indication for MO with the same frequency as a serving frequency, or for MO with different frequency from serving frequency.

In one embodiment of the present disclosure, optionally, configuration manner of one or more serving cells configured by the network device, includes any one or more of the following combinations:

one or more serving cells indicated by the network device through a physical cell identifier (PCI) and a frequency;

one or more serving cells indicated by the network device through a cell index; and one or more serving cells indicated by the network device through an E-UTRAN cell global identifier (ECGI).

In one embodiment of the present disclosure, optionally, configuration manner of one or more special cells (SpCell) configured by the network device, includes any one or more of the following combinations:

a primary cell (PCell) and/or a primary-secondary cell (PSCell) defaulted by the network device;

a PCell and/or a PSCell configured by the network device;

a PCell and/or a PSCell indicated by the network device through a physical cell identifier (PCI) and a frequency;

a PCell and/or a PSCell indicated by the network device through a cell index;

a PCell and/or a PSCell indicated by the network device through a ECGI.

In one embodiment of the present disclosure, optionally, configuration manner of one or more cells in a cell list configured by the network device, includes any one or more of the following combinations:

a serving cell indicated by the network device through a physical cell identifier (PCI) and a frequency;

a serving cell indicated by the network device through a cell index;

a serving cell indicated by the network device through a ECGI;

a PCell and/or a PSCell defaulted by the network device; and a PCell and/or a PSCell configured by the network device.

In one embodiment of the present disclosure, optionally, the frequency or the frequency group that can be referenced in the frequency list lists a center frequency.

In one embodiment of the present disclosure, optionally, the frequency list is not configured in the measurement object (MO), but is configured through fields in other dedicated signaling, i.e., setting fields in other dedicated signaling.

In this way, the synchronization indication information indicates one or more serving cells as timing reference for the neighboring cell, so that the UE can take the time of the corresponding serving cell as timing reference for the neighboring cell according to the synchronization indication information, thereby realizing explicit indication of whether the neighboring cell and the serving cell are synchronized, which facilitates the UE to measure the neighboring cell without blind detection and then saves power consumption of the UE.

One embodiment of the present disclosure further provides a user equipment. Since the principle of the user equipment solving the problem is similar to the synchronization indication method in the embodiment of the present disclosure, the implementation of the user equipment may refer to the implementation of the method, which will not be elaborated herein.

Figure 4:
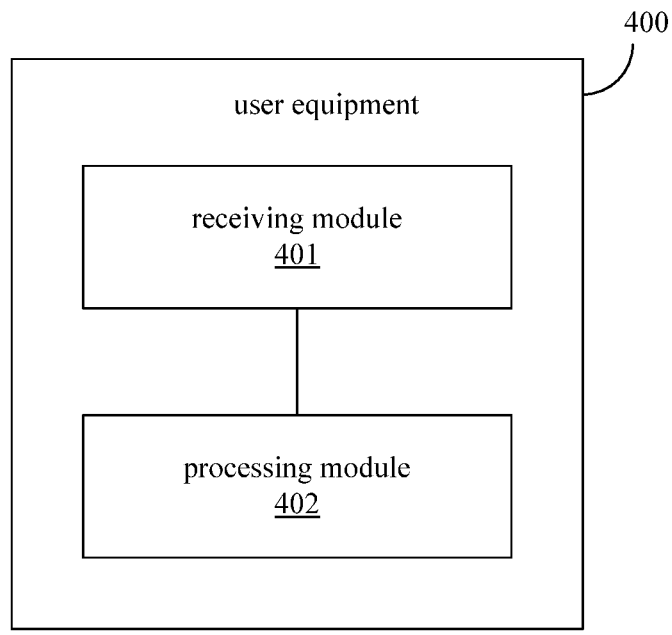
FIG. 4 is a first schematic diagram of a user equipment according to an embodiment of the present disclosure.

Referring to FIG. 4, it is a schematic diagram of a user equipment according to an embodiment of the present disclosure. The user equipment includes:

a receiving module 401 configured to receive synchronization indication information transmitted by a network device; where the synchronization indication information indicates one or more serving cells as timing reference for a neighboring cell; optionally, the synchronization indication information includes: a synchronization indication, and information corresponding to a serving cell that serves as a timing reference; and, a processing module 402 configured to take the time of the corresponding serving cell as timing reference for the neighboring cell according to the synchronization indication information.

In one embodiment of the present disclosure, optionally, the receiving module 401 is further configured to receive a broadcast message transmitted by the network device; where the broadcast message includes the synchronization indication information.

The processing module 402 is further configured to, when the synchronization indication information indicates true, take a current serving cell or a serving cell configured by the network device as timing reference for a neighboring cell at a current frequency; where the current frequency refers to a frequency at which the UE receives the broadcast message.

In one embodiment of the present disclosure, optionally, the synchronization indication information may be a field of useServingCellTimingForSync or other synchronization indication information field.

In one embodiment of the present disclosure, optionally, the receiving module 401 is further configured to receive a dedicated signaling transmitted by the network device; where the dedicated signaling includes the synchronization indication information.

The processing module 402 is further configured to, when the synchronization indication information indicates true, take the serving cell configured by the network device as timing reference for all or part of neighboring cells at a current measurement object frequency configured by the network device. Further, the synchronization indication information may be a field of useServingCellTimingForSync or other synchronization indication information field.

In one embodiment of the present disclosure, optionally, one or more serving cells that serves as timing reference for a neighboring cell refer to any one or more of the following combinations:

one or more serving cells configured by the network device;

one or more special cells (SpCell) configured by the network device;

one or more cells in a cell list configured by the network device;

a cell corresponding to a frequency or a frequency group in a frequency list; and a reference serving cell configured in measurement object (MO); where the reference serving cell configured in the MO may be used as timing reference for all cells (intra-frequency and/or inter-frequency) associated with the same RAT as the reference serving cell.

In one embodiment of the present disclosure, optionally, configuration manner of one or more serving cells configured by the network device, includes any one or more of the following combinations:

one or more serving cells indicated by the network device through a physical cell identifier (PCI) and a frequency;

one or more serving cells indicated by the network device through a cell index; and one or more serving cells indicated by the network device through an E-UTRAN cell global identifier (ECGI).

In one embodiment of the present disclosure, optionally, configuration manner of one or more special cells (SpCell) configured by the network device, includes any one or more of the following combinations:

a primary cell (PCell) and/or a primary-secondary cell (PSCell) defaulted by the network device;

a PCell and/or a PSCell configured by the network device;

a PCell and/or a PSCell indicated by the network device through a physical cell identifier (PCI) and a frequency;

a PCell and/or a PSCell indicated by the network device through a cell index;

a PCell and/or a PSCell indicated by the network device through a ECGI.

In one embodiment of the present disclosure, optionally, configuration manner of one or more cells in a cell list configured by the network device, includes any one or more of the following combinations:

a serving cell indicated by the network device through a physical cell identifier (PCI) and a frequency;

a serving cell indicated by the network device through a cell index;

a serving cell indicated by the network device through a ECGI;

a PCell and/or a PSCell defaulted by the network device; and a PCell and/or a PSCell configured by the network device.

In one embodiment of the present disclosure, optionally, the frequency or the frequency group that can be referenced in the frequency list lists a center frequency.

In one embodiment of the present disclosure, optionally, the frequency list is not configured in the measurement object (MO), but is configured through fields in other dedicated signaling, i.e., setting fields in other dedicated signaling.

The user equipment provided in the embodiments of the present disclosure may execute the above method embodiments, and its implementation principles and technical effects are similar, which will not be elaborated in this embodiment.

One embodiment of the present disclosure further provides a network device. Since the principle of the network device solving the problem is similar to the synchronization indication method in the embodiment of the present disclosure, the implementation of the network device may refer to the implementation of the method, which will not be elaborated herein.

Figure 5:
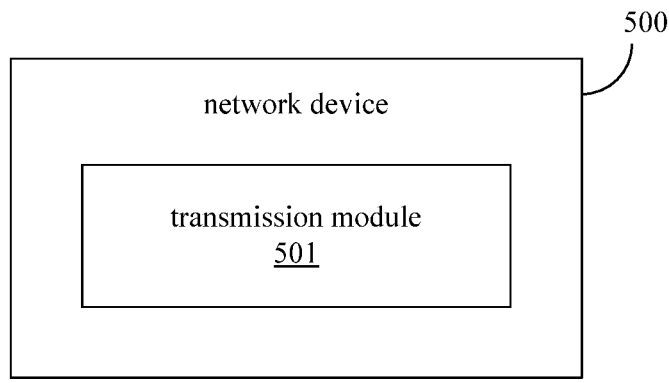
FIG. 5 is a first schematic diagram of a network device according to an embodiment of the present disclosure.

Referring to FIG. 5, it is a schematic diagram of a network device according to an embodiment of the present disclosure. The network device 500 includes:

a transmission module 501 configured to transmit synchronization indication information to a UE, where the synchronization indication information indicates one or more serving cells as timing reference for a neighboring cell; optionally, the synchronization indication information includes: a synchronization indication, and information corresponding to a serving cell that serves as a timing reference.

In one embodiment of the present disclosure, optionally, the transmission module 501 is further configured to transmit a broadcast message to the UE, where the broadcast message includes the synchronization indication information; or, transmit a dedicated signaling to the UE, where the dedicated signaling includes the synchronization indication information.

In one embodiment of the present disclosure, optionally, one or more serving cells that serves as timing reference for a neighboring cell refer to any one or more of the following combinations:

one or more serving cells configured by the network device;

one or more special cells (SpCell) configured by the network device;

one or more cells in a cell list configured by the network device;

a cell corresponding to a frequency or a frequency group in a frequency list; and a reference serving cell configured in measurement object (MO); where the reference serving cell configured in the MO may be used as timing reference for all cells (intra-frequency and/or inter-frequency) associated with the same RAT as the reference serving cell.

In one embodiment of the present disclosure, optionally, configuration manner of one or more serving cells configured by the network device, includes any one or more of the following combinations:

one or more serving cells indicated by the network device through a physical cell identifier (PCI) and a frequency;

one or more serving cells indicated by the network device through a cell index; and one or more serving cells indicated by the network device through an E-UTRAN cell global identifier (ECGI).

In one embodiment of the present disclosure, optionally, configuration manner of one or more special cells (SpCell) configured by the network device, includes any one or more of the following combinations:

a primary cell (PCell) and/or a primary-secondary cell (PSCell) defaulted by the network device;

a PCell and/or a PSCell configured by the network device;

a PCell and/or a PSCell indicated by the network device through a physical cell identifier (PCI) and a frequency;

a PCell and/or a PSCell indicated by the network device through a cell index;

a PCell and/or a PSCell indicated by the network device through a ECGI.

In one embodiment of the present disclosure, optionally, configuration manner of one or more cells in a cell list configured by the network device, includes any one or more of the following combinations:

a serving cell indicated by the network device through a physical cell identifier (PCI) and a frequency;

a serving cell indicated by the network device through a cell index;

a serving cell indicated by the network device through a ECGI;

a PCell and/or a PSCell defaulted by the network device; and a PCell and/or a PSCell configured by the network device.

In one embodiment of the present disclosure, optionally, the frequency or the frequency group that can be referenced in the frequency list lists a center frequency.

In one embodiment of the present disclosure, optionally, the frequency list is not configured in the measurement object (MO), but is configured through fields in other dedicated signaling, i.e., setting fields in other dedicated signaling.

The network device provided in the embodiments of the present disclosure may execute the above method embodiments, and its implementation principles and technical effects are similar, which will not be elaborated in this embodiment.

Figure 6:
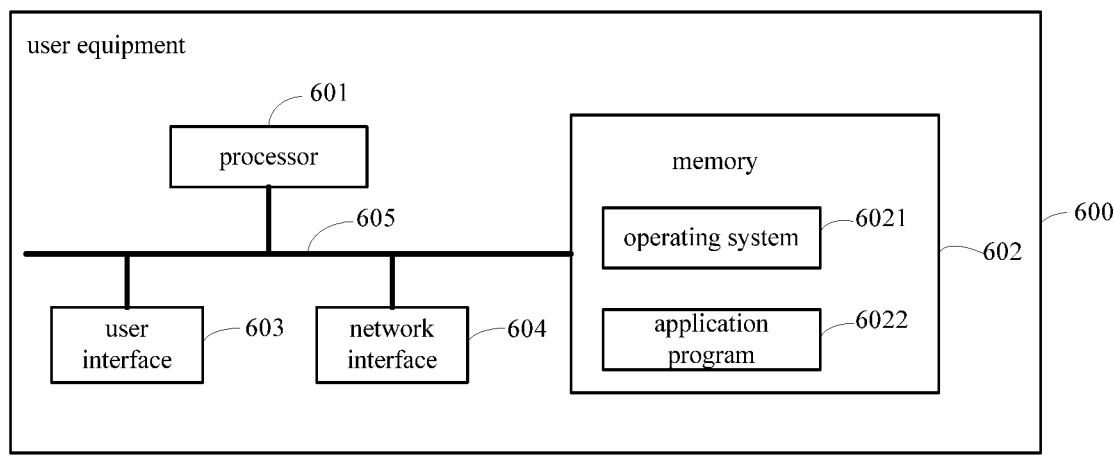
FIG. 6 is a second schematic diagram of a user equipment according to an embodiment of the present disclosure.

Referring to FIG. 6, a user equipment 600 shown in FIG. 6 includes: at least one processor 601, a memory 602, at least one network interface 604 and a user interface 603. Various components in the user equipment 600 are coupled together via bus system 605. It can be understood that the bus system 605 is used to implement connected communication among these components. Besides a data bus, the bus system 605 further includes: a power bus, control bus and a state signal bus. For clear description, various buses in FIG. 6 are labeled as the bus system 605.

The user interface 603 may include a display device, keyboard or click device (such as a mouse, trackball, touch board or touch screen, etc.).

It can be understood that the memory 602 in embodiments of the present disclosure may be a volatile storage or a nonvolatile storage, or both the volatile and non-volatile storage. The nonvolatile storage may be Read Only Memory (ROM), Programmable Read-Only Memory (PROM), Erasable Programmable Read-Only Memory (EPROM), Electrically Erasable Programmable Read-Only Memory (EEPROM) or flash. The volatile storage may be Random Access Memory (RAM), which is used as an external cache. As an illustrative but not restrictive specification, many forms of RAMs are available, such as Static RAM (SRAM), Dynamic RAM (DRAM), Synchronous DRAM (SDRAM), Double Data Rate SDRAM (DDRSDRAM), Enhanced SDRAM (ESDRAM), Synch Link DRAM (SLDRAM) and Direct Rambus RAM (DRRAM). The memory 602 of the system and method described in embodiments of the present disclosure include, but is not limited to, these and any other suitable types of storages.

In some embodiments, the memory 602 stores following elements, such as executable modules, data structure, subset thereof, or superset thereof: operating system 6021 and application programs 6022.

The operating system 6021 includes various kinds of system programs, such as a framework layer, a core library layer and a driver layer, which are used to implement various kinds of basic services and process hardware-based tasks. The application programs 6022 include various kinds of application programs, such as Media Player and Browser, which are used to implement various kinds of application services. Programs, which are used to implement methods in embodiments of the present disclosure, may be included in the program applications 6022.

In embodiments of the present disclosure, programs or instructions stored in the memory 602 are called, specifically, the programs or instructions stored in the application programs 6022 are called to execute following steps of: receiving synchronization indication information transmitted by a network device, where the synchronization indication information indicates one or more serving cells as timing reference for a neighboring cell; according to the synchronization indication information, taking the time of the corresponding serving cell as timing reference for the neighboring cell.

The user equipment provided in the embodiments of the present disclosure may execute the above method embodiments, and its implementation principles and technical effects are similar, which will not be elaborated in this embodiment.

Figure 7:
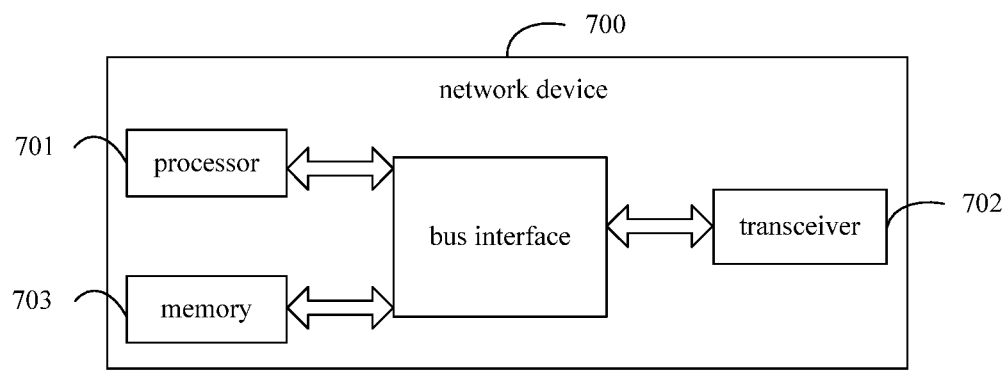
FIG. 7 is a second schematic diagram of a network device according to an embodiment of the present disclosure.

Referring to FIG. 7, FIG. 7 is a second schematic diagram of a network device according to an embodiment of the present disclosure. As shown in FIG. 7, the network device 700 includes: a processor 701, a transceiver 702, a memory 703 and a bus interface.

In one embodiment of the present disclosure, the network device 700 further includes: a computer program stored on the memory 703 and executable on the processor 701. The computer program is executed by the processor 701 to execute the following steps of transmitting synchronization indication information to a UE, where the synchronization indication information indicates one or more serving cells as timing reference for a neighboring cell.

In FIG. 7, the bus architecture can include any number of interconnected bus and bridge. Specifically, various circuits of one or more processors, which are represented by the processor 701, and one or more memories, which are represented by the memory 603, are linked together. The bus architecture may link various other circuits, such as a peripheral device, voltage regulator and a power management circuit together. These features are well known in this field, therefore, this disclosure does not make further description on these features. The bus interface provides an interface. The transceiver 702 may be multiple elements, including a transmitter and a receiver and provide units, which communicate with other devices on the transmission medium.

The processor 701 is responsible for managing bus architecture and general processing. The memory 703 may store data used by the processor 701 when executing operations.

The network device provided in the embodiments of the present disclosure may execute the above method embodiments, and its implementation principles and technical effects are similar, which will not be elaborated in this embodiment.

The steps of the method or algorithm described in the present disclosure may be implemented by hardware or by executing software instructions with a processor. The software instructions may be composed of corresponding software modules, and the software modules may be stored in RAM, flash memory, ROM, EPROM, EEPROM, registers, hard disk, mobile hard disk, read-only optical disk, or any other form of storage medium well known in the art. An exemplary storage medium is coupled to the processor so that the processor can read information from the storage medium and can write information to the storage medium. Of course, the storage medium may also be a component of the processor. The processor and the storage medium may be located in the ASIC. In addition, the ASIC may be located in a core network interface device. Of course, the processor and the storage medium may also exist as discrete components in the core network interface device.

Those skilled in the art should appreciate that in one or more of the above examples, the functions described in the present disclosure may be implemented by hardware, software, firmware, or any combination thereof. When implemented in software, these functions may be stored in a computer-readable medium or transmitted as one or more instructions or code on the computer-readable medium. The computer-readable media includes a computer storage media and communication media. The communication media includes any medium that facilitates transmission of a computer program from one place to another. The storage medium may be any available medium that may be accessed by a general-purpose or special-purpose computer.

The specific embodiments described above further describe the purpose, technical solutions and beneficial effects of the present disclosure in detail. It should be understood that the foregoing are only specific embodiments of the present disclosure and are not intended to limit the protection scope of the present disclosure. Any modifications, equivalent replacements and improvements based on the technical solutions of the present disclosure, should be included in the protection scope of the present disclosure.

Those skilled in the art will appreciate that embodiments of the disclosed embodiments may be provided as a method, a system, or a computer program product. Thus, the embodiments of the present disclosure may take the form of an entirely hardware embodiment, an entirely software embodiment, or a combination of software and hardware. Moreover, the embodiments of the present disclosure may take the form of a computer program product embodied on one or more computer usable storage media (including but not limited to a disk storage, CD-ROM, an optical storage, etc.) including computer usable program codes.

The present disclosure has been described with reference to the flow charts and/or block diagrams of the method, device (system) and computer program product according to the embodiments of the present disclosure. It should be understood that computer program instructions may be used to implement each of the work flows and/or blocks in the flow charts and/or the block diagrams, and the combination of the work flows and/or blocks in the flow charts and/or the block diagrams. These computer program instructions may be provided to a processor of a common computer, a dedicate computer, an embedded processor or any other programmable data processing devices to create a machine, so that instructions executable by the processor of the computer or the other programmable data processing devices may create a device to achieve the functions assigned in one or more work flows in the flow chart and/or one or more blocks in the block diagram.

These computer program instructions may also be stored in a computer readable storage that may guide the computer or the other programmable data process devices to function in a certain way, so that the instructions stored in the computer readable storage may create a product including an instruction unit which achieves the functions assigned in one or more flows in the flow chart and/or one or more blocks in the block diagram.

These computer program instructions may also be loaded in the computer or the other programmable data process devices, so that a series of operation steps are executed on the computer or the other programmable devices to create processes achieved by the computer. Therefore, the instructions executed in the computer or the other programmable devices provide the steps for achieving the function assigned in one or more flows in the flow chart and/or one or more blocks in the block diagram.

It will be apparent that those skilled in the art can make further changes and modifications to the embodiments. Therefore, the appended claims are intended to be interpreted as including the optional embodiments and all changes and modifications that fall within the scope of the present disclosure.

What is claimed is:

1. A synchronization indication method, applied to a user equipment, comprising:
   receiving synchronization indication information transmitted by a network device in case that there are different serving cells serving the user equipment, wherein the synchronization indication information indicates a plurality of serving cells from the different serving cells serving the user equipment as timing reference for a neighboring cell;
   taking time of a corresponding serving cell from the plurality of serving cells as timing reference for the neighboring cell according to the synchronization indication information;
   wherein the receiving synchronization indication information transmitted by a network device, comprises: receiving a broadcast message transmitted by the network device; wherein the broadcast message comprises the synchronization indication information; wherein the taking time of a corresponding serving cell from the plurality of serving cells as timing reference for the neighboring cell according to the synchronization indication information, comprises: when the synchronization indication information indicates true, taking a current serving cell or a serving cell configured by the network device from the plurality of serving cells as timing reference for a neighboring cell at a current frequency; wherein the current frequency refers to a frequency at which the broadcast message is received; or,
   wherein the receiving synchronization indication information transmitted by a network device, comprises: receiving a dedicated signaling transmitted by the network device; wherein the dedicated signaling comprises the synchronization indication information; wherein the taking time of a corresponding serving cell from the plurality of serving cells as timing reference for the neighboring cell according to the synchronization indication information, comprises: when the synchronization indication information indicates true, taking a serving cell configured by the network device from the plurality of serving cells as timing reference for all or part of neighboring cells at a current measurement object frequency configured by the network device;
   wherein the plurality of serving cells as timing reference for the neighboring cell comprise the following combinations:
   one or more serving cells configured by the network device;
   one or more special cells (SpCell) configured by the network device;
   one or more cells in a cell list configured by the network device;
   a reference serving cell configured in a measurement object (MO), wherein the reference serving cell configured in the MO is used as timing reference for all cells associated with the same radio access technology (RAT) as the reference serving cell configured in the MO;
   wherein configuration manner of one or more serving cells configured by the network device, comprises one or more serving cells indicated by the network device through an E-UTRAN cell global identifier (ECGI);
   wherein configuration manner of one or more special cells (SpCell) configured by the network device, comprises any one or more of the following combinations:
   a primary cell (PCell) and/or a primary-secondary cell (PSCell) defaulted by the network device;
   a PCell and/or a PSCell configured by the network device;
   a PCell and/or a PSCell indicated by the network device through an E-UTRAN cell global identifier (ECGI);
   wherein configuration manner of one or more cells in the cell list configured by the network device, comprises any one or more of the following combinations:
   a serving cell indicated by the network device through an E-UTRAN cell global identifier (ECGI);
   a PCell and/or a PSCell defaulted by the network device; and
   a PCell and/or a PSCell configured by the network device.

2. The method according to claim 1, wherein the synchronization indication information is a field of using time of serving cell for synchronization (useServingCellTimingForSync), or other synchronization indication information field.

3. The method according to claim 1, wherein the plurality of serving cells as timing reference for the neighboring cell further comprise
   a cell corresponding to a frequency or a frequency group in a frequency list.

4. The method according to claim 3, wherein configuration manner of one or more serving cells configured by the network device, further comprises any one or more of the following combinations:
   one or more serving cells indicated by the network device through a physical cell identifier (PCI) and a frequency;
   one or more serving cells indicated by the network device through a cell index.

5. The method according to claim 3, wherein configuration manner of one or more special cells (SpCell) configured by the network device, further comprises any one or more of the following combinations:
   a PCell and/or a PSCell indicated by the network device through a physical cell identifier (PCI) and a frequency;
   a PCell and/or a PSCell indicated by the network device through a cell index.

6. The method according to claim 3, wherein configuration manner of one or more cells in the cell list configured by the network device, further comprises any one or more of the following combinations:
  a serving cell indicated by the network device through a physical cell identifier (PCI) and a frequency;
  a serving cell indicated by the network device through a cell index.

7. The method according to claim 3, wherein the frequency or the frequency group available for reference in the frequency list lists a center frequency.

8. The method according to claim 1, wherein the synchronization indication information comprises a synchronization indication, and information corresponding to a serving cell that serves as timing reference.

9. A synchronization indication method, applied to a network device, comprising:
  transmitting synchronization indication information to a user equipment in case that there are different serving cells serving the user equipment, wherein the synchronization indication information indicates a plurality of serving cells from the different serving cells serving the user equipment as timing reference for a neighboring cell;
  wherein the transmitting synchronization indication information to a user equipment, comprises:
  transmitting a broadcast message to the user equipment;
    wherein the broadcast message comprises the synchronization indication information; when the synchronization indication information indicates true, the user equipment takes a current serving cell or a serving cell configured by the network device from the plurality of serving cells as timing reference for a neighboring cell at a current frequency; wherein the current frequency refers to a frequency at which the broadcast message is received;
  or,
  transmitting a dedicated signaling to the user equipment;
    wherein the dedicated signaling comprises the synchronization indication information; when the synchronization indication information indicates true, the user equipment takes a serving cell configured by the network device from the plurality of serving cells as timing reference for all or part of neighboring cells at a current measurement object frequency configured by the network device;
  wherein the plurality of serving cells as timing reference for the neighboring cell comprise the following combinations:
  one or more serving cells configured by the network device;
  one or more special cells (SpCell) configured by the network device;
  one or more cells in a cell list configured by the network device;
  a reference serving cell configured in a measurement object (MO), wherein the reference serving cell configured in the MO is used as timing reference for all cells associated with the same radio access technology (RAT) as the reference serving cell configured in the MO;
  wherein configuration manner of one or more serving cells configured by the network device, comprises one or more serving cells indicated by the network device through an E-UTRAN cell global identifier (ECGI);
  wherein configuration manner of one or more special cells (SpCell) configured by the network device, comprises any one or more of the following combinations:
    a primary cell (PCell) and/or a primary-secondary cell (PSCell) defaulted by the network device;
    a PCell and/or a PSCell configured by the network device;
    a PCell and/or a PSCell indicated by the network device through an E-UTRAN cell global identifier (ECGI);
  wherein configuration manner of one or more cells in the cell list configured by the network device, comprises any one or more of the following combinations:
    a serving cell indicated by the network device through an E-UTRAN cell global identifier (ECGI);
    a PCell and/or a PSCell defaulted by the network device; and
    a PCell and/or a PSCell configured by the network device.

10. The method according to claim 9, wherein the synchronization indication information is a field of using time of serving cell for synchronization (useServingCellTimingForSync), or other synchronization indication information field.

11. The method according to claim 9, wherein the plurality of serving cells as timing reference for the neighboring cell further comprise
  a cell corresponding to a frequency or a frequency group in a frequency list.

12. The method according to claim 11, wherein configuration manner of one or more serving cells configured by the network device, further comprises any one or more of the following combinations:
  one or more serving cells indicated by the network device through a physical cell identifier (PCI) and a frequency;
  one or more serving cells indicated by the network device through a cell index.

13. The method according to claim 11, wherein configuration manner of one or more special cells (SpCell) configured by the network device, further comprises any one or more of the following combinations:
  a PCell and/or a PSCell indicated by the network device through a physical cell identifier (PCI) and a frequency;
  a PCell and/or a PSCell indicated by the network device through a cell index.

14. The method according to claim 11, wherein configuration manner of one or more cells in the cell list configured by the network device, further comprises any one or more of the following combinations:
  a serving cell indicated by the network device through a physical cell identifier (PCI) and a frequency;
  a serving cell indicated by the network device through a cell index.

15. The method according to claim 9, wherein the synchronization indication information comprises a synchronization indication, and information corresponding to a serving cell that serves as timing reference.

16. A user equipment, comprising: a processor, a memory, and a computer program stored on the memory and executable on the processor; wherein the computer program is executed by the processor to implement steps of:
  receiving synchronization indication information transmitted by a network device in case that there are different serving cells serving the user equipment, wherein the synchronization indication information indicates a plurality of serving cells from the different serving cells serving the user equipment as timing reference for a neighboring cell;

taking time of a corresponding serving cell from the plurality of serving cells as timing reference for the neighboring cell according to the synchronization indication information;

wherein the computer program is executed by the processor to implement steps of:

receiving a broadcast message transmitted by the network device; wherein the broadcast message comprises the synchronization indication information;

when the synchronization indication information indicates true, taking a current serving cell or a serving cell configured by the network device from the plurality of serving cells as timing reference for a neighboring cell at a current frequency; wherein the current frequency refers to a frequency at which the broadcast message is received;

or, receiving a dedicated signaling transmitted by the network device; wherein the dedicated signaling comprises the synchronization indication information;

when the synchronization indication information indicates true, taking a serving cell configured by the network device from the plurality of serving cells as timing reference for all or part of neighboring cells at a current measurement object frequency configured by the network device;

wherein the plurality of serving cells as timing reference for the neighboring cell comprise the following combinations:

one or more serving cells configured by the network device;

one or more special cells (SpCell) configured by the network device;

one or more cells in a cell list configured by the network device;

a reference serving cell configured in a measurement object (MO), wherein the reference serving cell configured in the MO is used as timing reference for all cells associated with the same radio access technology (RAT) as the reference serving cell configured in the MO;

wherein configuration manner of one or more serving cells configured by the network device, comprises one or more serving cells indicated by the network device through an E-UTRAN cell global identifier (ECGI);

wherein configuration manner of one or more special cells (SpCell) configured by the network device, comprises any one or more of the following combinations:

a primary cell (PCell) and/or a primary-secondary cell (PSCell) defaulted by the network device;

a PCell and/or a PSCell configured by the network device;

a PCell and/or a PSCell indicated by the network device through an E-UTRAN cell global identifier (ECGI);

wherein configuration manner of one or more cells in the cell list configured by the network device, comprises any one or more of the following combinations:

a serving cell indicated by the network device through an E-UTRAN cell global identifier (ECGI);

a PCell and/or a PSCell defaulted by the network device; and a PCell and/or a PSCell configured by the network device.

17. A network device, comprising: a processor, a memory, and a computer program stored on the memory and executable on the processor; wherein the computer program is executed by the processor to implement steps of the method according to claim 9.

* * * * *